(12) United States Patent
Gadonniex et al.

(10) Patent No.: US 11,145,176 B1
(45) Date of Patent: *Oct. 12, 2021

(54) PHOTOELECTRIC SMOKE DETECTORS

(71) Applicant: Carrier Corporation, Palm Beach Gardens, FL (US)

(72) Inventors: Dennis Gadonniex, Bradenton, FL (US); Vipul Patel, Sarasota, FL (US)

(73) Assignee: Carrier Corporation, Palm Beach Gardens, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/929,871

(22) Filed: May 27, 2020

Related U.S. Application Data

(63) Continuation-in-part of application No. 16/824,054, filed on Mar. 19, 2020.

(51) Int. Cl.
| | |
|---|---|
| *G06F 16/78* | (2019.01) |
| *G08B 17/103* | (2006.01) |
| *G01N 21/53* | (2006.01) |

(52) U.S. Cl.
CPC .......... *G08B 17/103* (2013.01); *G01N 21/53* (2013.01)

(58) Field of Classification Search
USPC .......................................................... 356/73
See application file for complete search history.

(56) References Cited

U.S. PATENT DOCUMENTS

| | | | | |
|---|---|---|---|---|
| 4,238,679 A | * | 12/1980 | Macmillan ........... | G08B 17/113 250/385.1 |
| 6,433,700 B1 | * | 8/2002 | Malewski ............ | G08B 17/113 340/628 |
| 2018/0149581 A1 | * | 5/2018 | Lo ....................... | G01N 21/0303 |

FOREIGN PATENT DOCUMENTS

| | | |
|---|---|---|
| CN | 201044119 Y | 4/2008 |
| EP | 1146492 B1 | 5/2003 |

* cited by examiner

*Primary Examiner* — Tarifur R Chowdhury
*Assistant Examiner* — Omar H Nixon
(74) *Attorney, Agent, or Firm* — James A. Edwards

(57) ABSTRACT

A photoelectric smoke detector includes an optics cover that provides a smoke chamber that has a smoke chamber opening, a blocking component is mounted to the optics cover. An inner cover provides a first opening and a second opening. The first opening receives a portion of the blocking component and the second opening is aligned with the smoke chamber opening. A spoiler is received against the inner cover. The spoiler includes at least one of: a U-shaped fin arrangement and a Y-shaped fin arrangement.

21 Claims, 11 Drawing Sheets

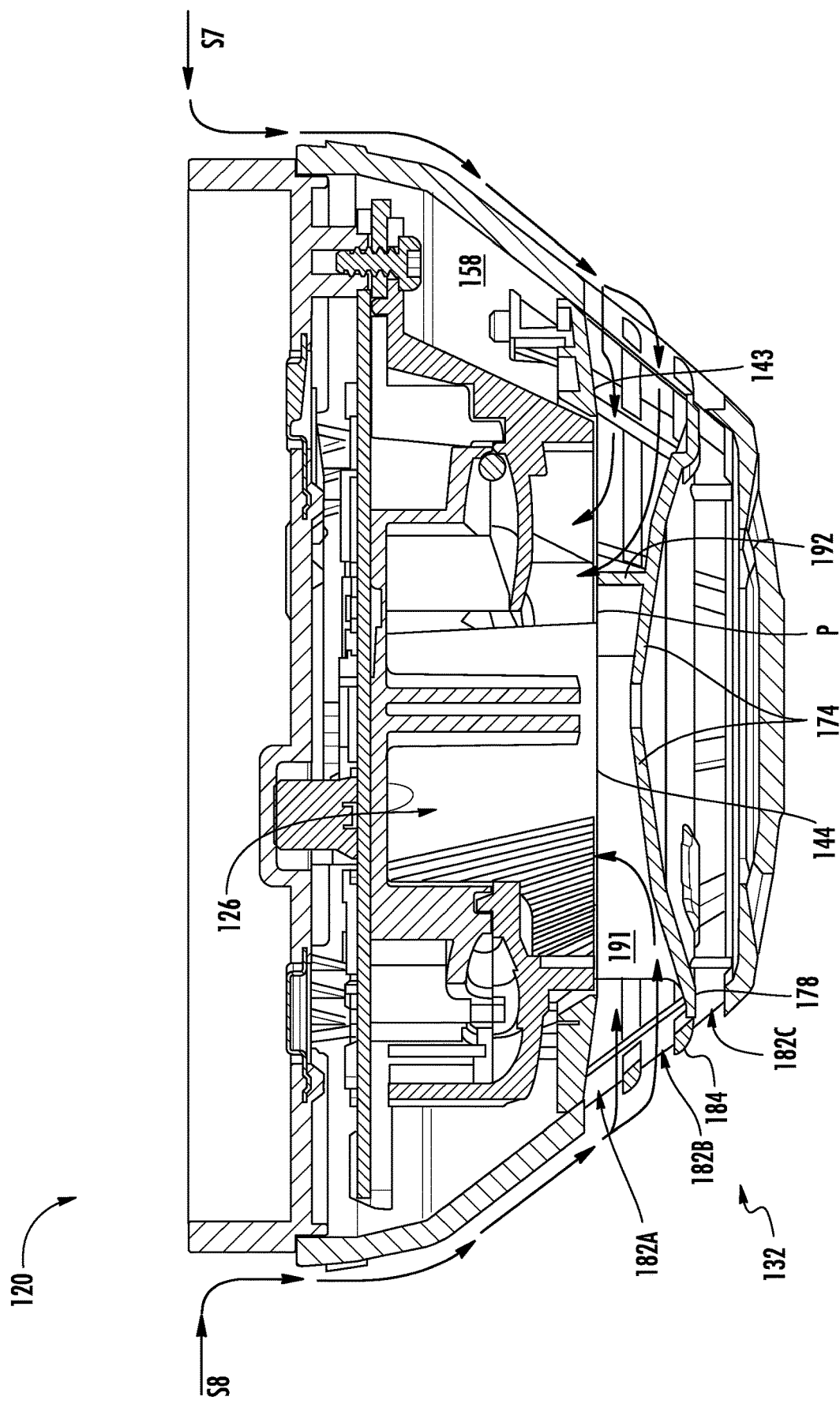

PHOTOELECTRIC SMOKE DETECTORS

CROSS REFERENCE TO A RELATED APPLICATION

This application is a continuation-in-part of U.S. Non-Provisional application Ser. No. 16/824,054 filed Mar. 19, 2020, the contents of which are hereby incorporated in their entirety.

BACKGROUND

This application relates to smoke detectors, and more particularly photoelectric smoke detectors.

A photoelectric smoke detector includes a light source and a photoelectric receiver to detect whether or not smoke is present. Smoke is determined to be present when a change in the amount of light received at the photoelectric receiver exceeds a pre-determined value. Upon the smoke detector determining smoke is present, a fire alarm is tripped.

SUMMARY

A photoelectric smoke detector, according to an example of this disclosure includes an optics cover that provides a smoke chamber that has a smoke chamber opening, a blocking component is mounted to the optics cover. An inner cover provides a first opening and a second opening. The first opening receives a portion of the blocking component and the second opening is aligned with the smoke chamber opening. A spoiler is received against the inner cover. The spoiler includes at least one of: a U-shaped fin arrangement and a Y-shaped fin arrangement.

In a further example of the foregoing, the second opening has a contour substantially the same as a contour of a lip of the optics cover that provides the smoke chamber opening.

In a further example of any of the foregoing, the first opening is substantially T-shaped.

In a further example of any of the foregoing, the second opening is substantially D-shaped.

In a further example of any of the foregoing, the inner cover includes a divider portion that separates the first opening from the second opening.

In a further example of any of the foregoing, the fin arrangement abuts the divider portion.

In a further example of any of the foregoing, the inner cover includes first and second projections angled to create a tapered path across an outer portion of the inner cover.

In a further example of any of the foregoing, the spoiler includes a ring portion, and a conical portion that extends from the ring portion. The fin arrangement extends from the conical portion.

In a further example of any of the foregoing, the conical portion tapers as it extends toward the optics cover.

In a further example of any of the foregoing, an outer cover is attached to a base portion, and the outer cover includes an open entry portion.

In a further example of any of the foregoing, a gap is provided between the blocking component and the outer cover. The inner cover seals the gap from the entry portion to prevent smoke particles from entering the gap.

In a further example of any of the foregoing, the entry portion includes a first row of openings, a second row of openings, and a third row of openings. A bottom surface of the inner cover is flush with an upper surface of the first row of openings.

In a further example of any of the foregoing, an outer edge of the spoiler is received against a horizontal bar between the second row of openings and the third row of openings.

In a further example of any of the foregoing, the inner cover is heat staked to an outer cover.

In a further example of any of the foregoing, the inner cover is snap-fit to an outer cover.

In a further example of any of the foregoing, bug screen is positioned over the smoke chamber opening.

In a further example of any of the foregoing, the fin arrangement extends to a plane that is provided at an outer lip of the smoke chamber, and the outer lip provides the smoke chamber opening.

In a further example of any of the foregoing, the fin arrangement is open toward the blocking component.

In a further example of any of the foregoing, the U-shaped fin arrangement includes a first fin portion substantially parallel to the top of a central axis of the blocking component. A second fin portion and a third fin portion are substantially parallel to the second fin portion.

In a further example of any of the foregoing, the Y-shaped fin arrangement includes a first fin portion and a second fin portion defining an angle therebetween, and a third fin portion approximately equidistant from the first fin portion and the second fin portion.

A photoelectric smoke detector according to an example of this disclosure includes a base portion, a circuit received on the base portion, an optics cover that is mounted to the base portion and provides a smoke chamber that has a smoke chamber opening. A blocking component is mounted to the optics cover. An inner cover provides a first opening and a second opening. The first opening receives a portion of the blocking component and the second opening is aligned with the smoke chamber opening. A spoiler includes a ring portion, a conical portion that extends from the ring portion toward the smoke chamber, and at least one of: a U-shaped fin arrangement and a Y-shaped fin arrangement that extends from the conical portion. The spoiler is received against the inner cover. An outer cover is attached to a base portion. The outer cover includes an open entry portion. A gap is provided between the blocking component and the outer cover, and the inner cover seals the gap from the entry portion to prevent smoke particles from entering the gap.

These and other features may be best understood from the following specification and drawings, the following of which is a brief description.

BRIEF DESCRIPTION OF THE DRAWINGS

FIG. 16 illustrates a cross sectional view of the example smoke detector of FIG. 12.

DETAILED DESCRIPTION

Figure 1:
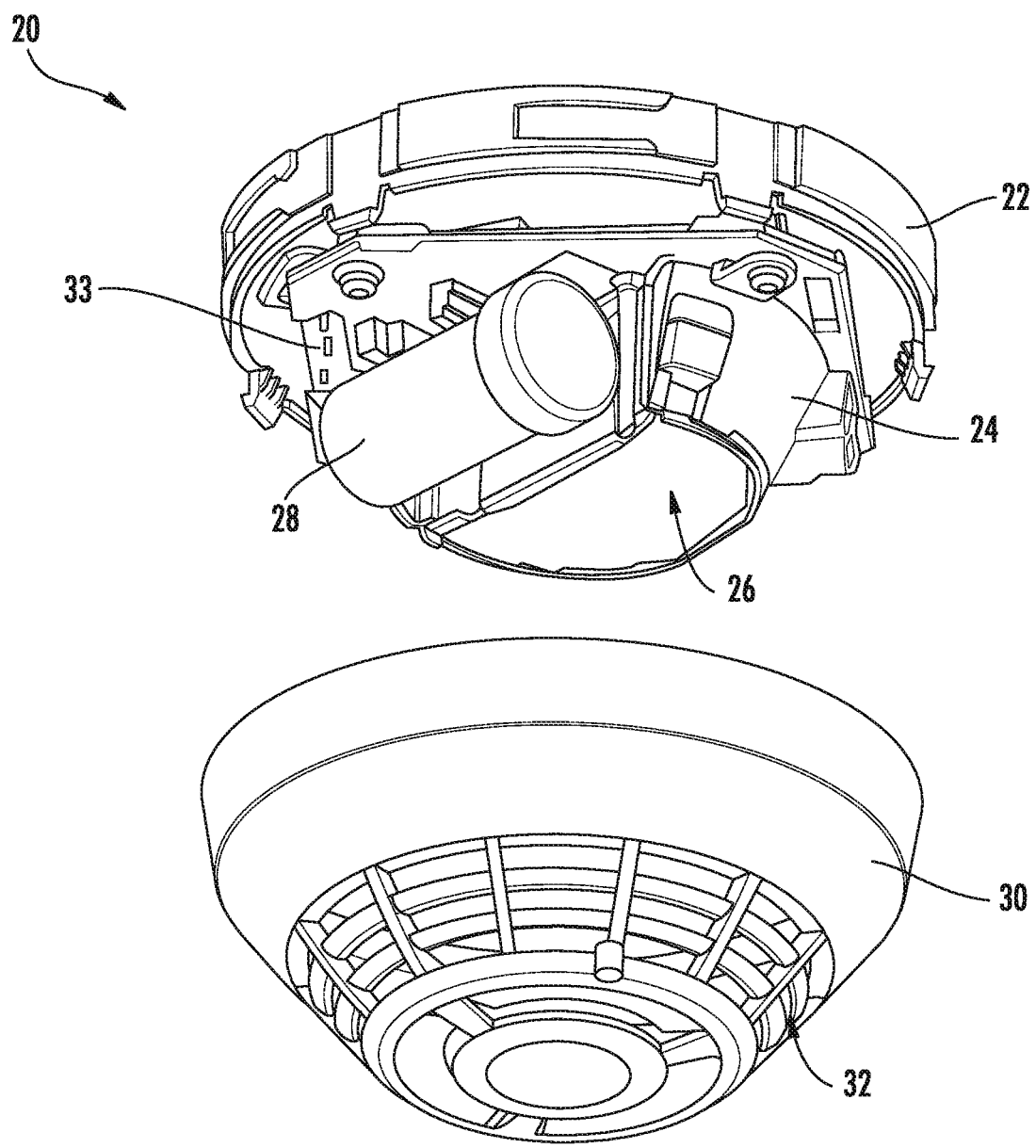
FIG. 1 illustrates a prior art smoke detector.

FIG. 1 illustrates a prior art smoke detector 20. A base portion 22 for mounting to a surface, such as a ceiling in some examples, is provided. An optics cover 24 is attached to the base portion 22 and provides a smoke chamber 26. The example smoke detector 20 is a photoelectric smoke detector. In a photoelectric smoke detector, a light source (not shown) is aimed into the smoke chamber 26 at an angle away from a receiver (not shown). When smoke enters the chamber 26, smoke particles scatter the light from the light source onto the receiver, which then triggers an alarm. In some examples, the smoke detector 20 is a multi-wave multi-angle photoelectric smoke detector, as is known to include multiple photoelectric elements, such as several light sources and/or several receivers, to allow for multiple different types of signals.

A blocking component 28 (e.g., such as, a carbon monoxide (CO) detector, a heat/gas sensor, a capacitor, an inductor, a sounder, or a speaker) is commonly mounted to the optics cover 24 outside of the smoke chamber 26. For example, the blocking component 28 may be a carbon monoxide (CO) detector used for detecting the presence of carbon monoxide. An outer cover 30 attaches to the base portion 22 but is shown as removed from the base portion 22 for ease of viewing. The outer cover 30 includes an open entry portion 32 for allowing smoke particles to enter the smoke detector 20 for detection. A circuit board 33 may be provided between the optics cover 24 and the base portion 22 to mechanically support and electrically connect electronic components of the smoke detector 20. The smoke detector 20 may include one or more inserts (not shown) for directing smoke particles from the entry portion 32 into the smoke chamber 26.

Directional orientations in this disclosure such as "above," "below," "top," "bottom," and the like are made with reference to ceiling mounted smoke detectors, but one of ordinary skill in the art having the benefit of this disclosure would recognize that smoke detectors mounted in other orientations may also benefit.

Applicant has identified that when smoke enters in certain directions of entry, such as directions of entry near large components such as CO detectors, prior art smoke detectors 20 are less efficient at directing smoke into the smoke chamber 26 for detection than when smoke enters from other directions.

Figure 2:
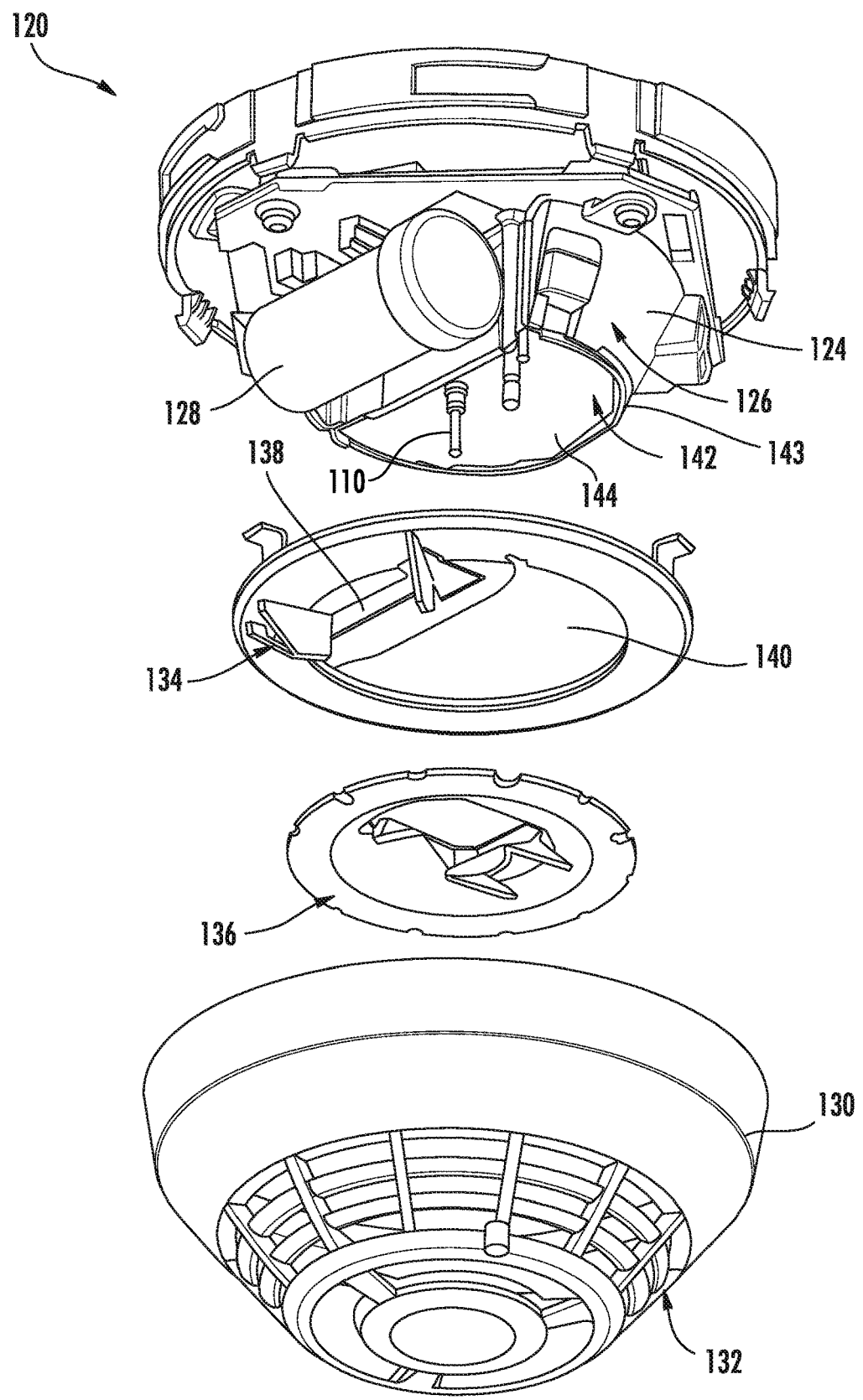
FIG. 2 illustrates an example smoke detector with a spoiler including a U-shaped fin arrangement.

FIG. 2 illustrates an improved smoke detector 120 including a spoiler 136 with a U-shaped fin arrangement. It should be understood that like reference numerals identify corresponding or similar elements throughout the several drawings. An inner cover 134 and the spoiler 136 are provided in the smoke detector 120 to uniformly direct smoke particles entering the smoke detector 120 from all directions into the smoke chamber 126 and to prevent smoke particles from entering gaps outside of the smoke chamber 126.

In some examples, as shown, the inner cover 134 provides an opening 138 contoured to receive a portion of the blocking component 128 and an opening 140 positioned to align with the opening 142 of the optics cover 124. In some examples, as shown, the opening 138 is substantially T-shaped to accommodate two differently sized cylindrical portions of the blocking component 128. Other shapes may be used to accommodate differently shaped blocking components in some examples. In some examples, as shown, the opening 140 has substantially the same contour as the opening 142. In some examples, as shown, the openings 140, 142 are substantially D-shaped. In some examples, as shown, the lip 143 of the opening 142 has substantially the same contour as the perimeter of the opening 140. Other shapes may be utilized to accommodate differently shaped smoke chambers in some examples. In some examples, a porous bug screen 144 may be placed over the opening 142 to prevent insects and the like from entering the smoke chamber 126.

The outer cover 130, the inner cover 134, and the spoiler 136 are shown in exploded form for ease of viewing, but, when assembled, the inner cover 134 is received against the blocking component 128 and the optics cover 124, and the spoiler 136 is received against the inner cover 134. As discussed further below, in some examples, the inner cover 134 may be attached to an inner surface of the outer cover 130.

In some examples, the inner cover 134 and the spoiler 136 are made of thermoplastic materials. In some examples the inner cover 134 and the spoiler 136 are made of acrylonitrile butadiene styrene (ABS).

Figure 12:
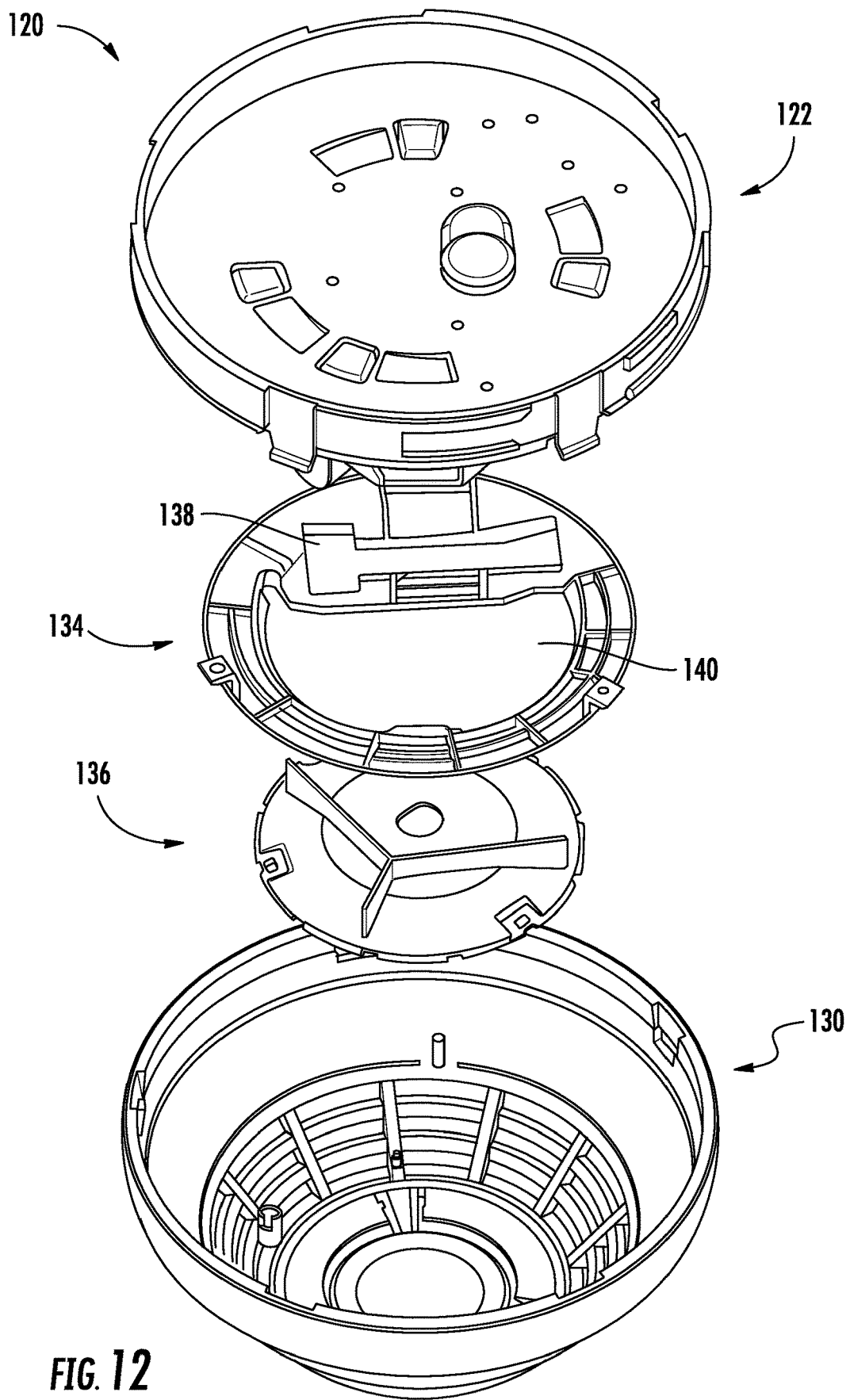
FIG. 12 illustrates an example smoke detector with a spoiler including a Y-shaped fin arrangement.

FIG. 12 illustrates an improved smoke detector 120 including a spoiler 136 with a Y-shaped fin arrangement. This spoiler 136, like the spoiler 136 shown in FIG. 2, is provided in the smoke detector 120 to uniformly direct smoke particles entering the smoke detector 120 from all directions into the smoke chamber 126 (not shown; see FIG. 16) and to prevent smoke particles from entering gaps outside of the smoke chamber 126. The spoiler 136 with the Y-shaped fin arrangement may be assembled with the outer cover 130 and the inner cover 134. When assembled, the inner cover 134 is received against the blocking component 128 (similar to as shown in FIG. 2) and the optics cover 124, and the spoiler 136 is received against the inner cover 134. This spoiler 136, as with the one shown in FIG. 2, may be made of thermoplastic materials. However, the spoiler 136 may be made of acrylonitrile butadiene styrene (ABS).

Figure 3:
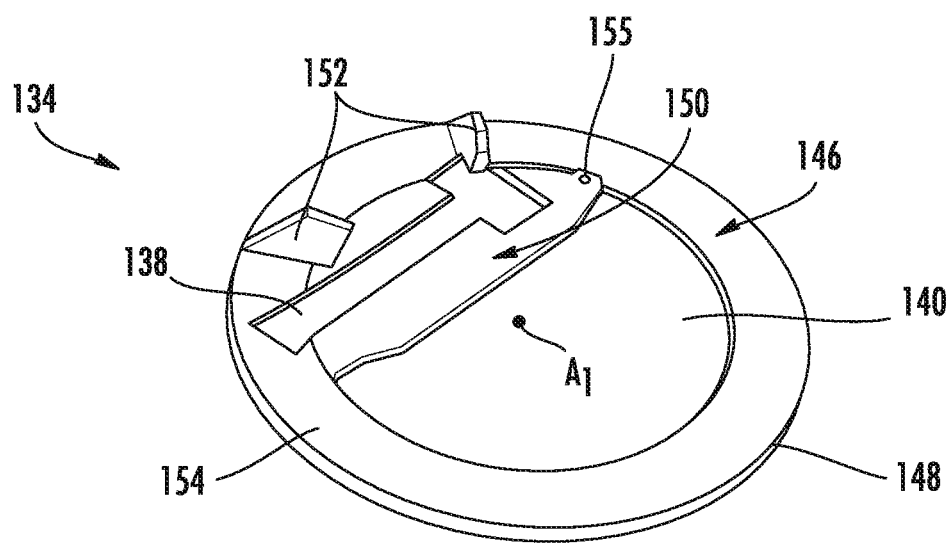
FIG. 3 illustrates an example inner cover of FIG. 2.
Figure 4:
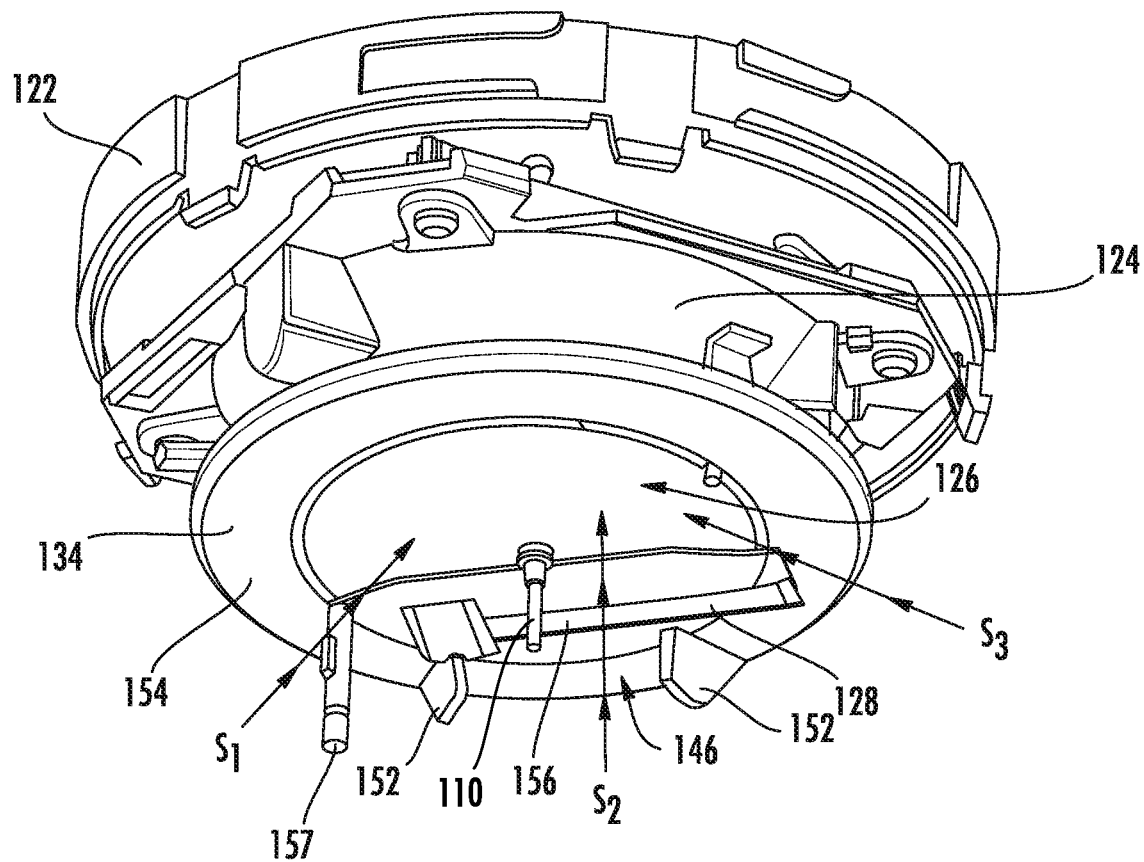
FIG. 4 illustrates a portion of the example smoke detector of FIG. 2.
Figure 13:
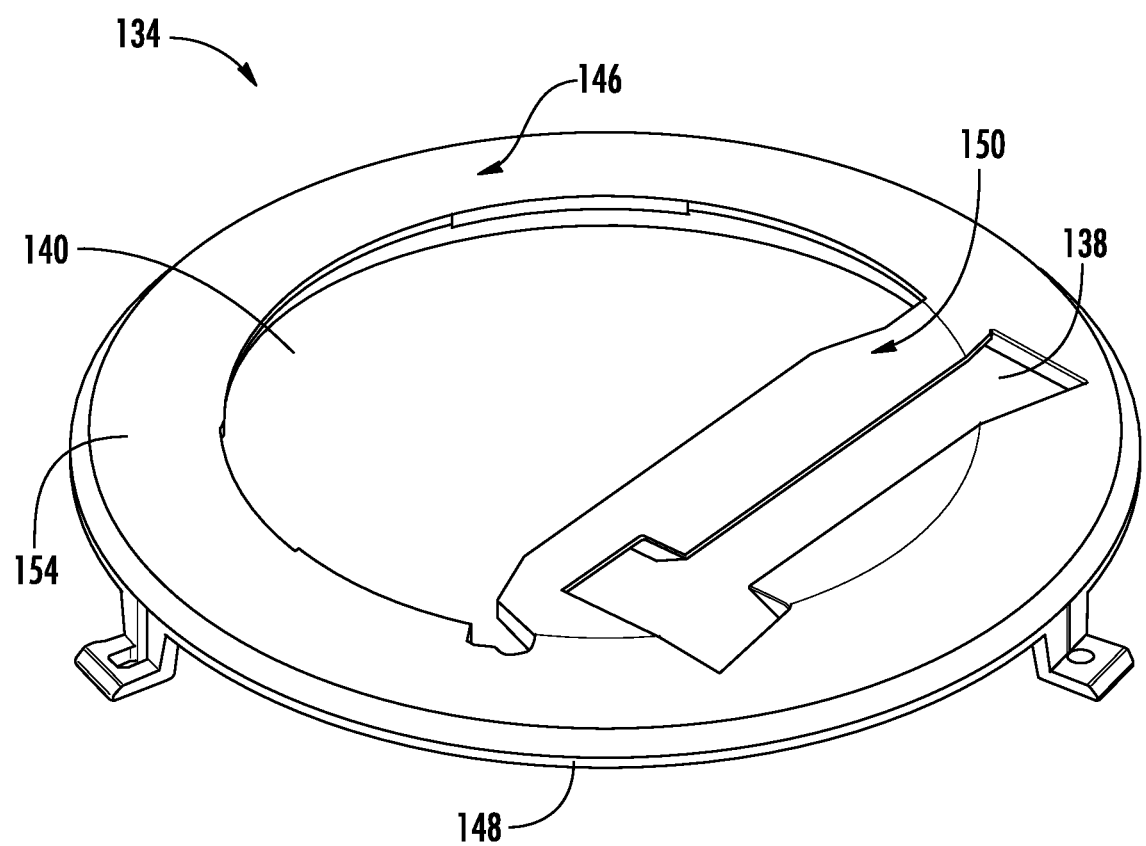
FIG. 13 illustrates an example inner cover of FIG. 12.

FIG. 3 illustrates the inner cover 134 shown in FIG. 2. The inner cover 134 includes an outer portion 146 providing an outer edge 148. The outer edge 148 of the inner cover 134 is shaped to be received by the outer cover 130 as described below with reference to FIG. 5. In some examples, the outer portion 146 may have a taper. In some examples, such as the example of FIG. 3, outer portion 146 may provide a circular outer edge 148 and the outer portion 146 may have a conical taper. A divider portion 150 separates the opening 138 from the opening 140. The inner cover 134 may further include projections 152 extending from a bottom surface 154. However, in certain instances (as shown in FIG. 13) the inner cover 134 may not include projections 152. As shown in FIG. 4, the inner cover 134 may be positioned about a central axis A1 relative to the outer edge 148 in some examples. As shown, the axis A1 extends through the opening 140 in some examples. The inner cover 134 may include a light pipe aperture 155 for receiving a light pipe indicator 157 (see FIG. 4).

FIG. 4 illustrates the inner cover 134 received against the optics cover 124. The bottom surface 154 faces away from the base portion 122 when assembled. In some embodiments a light pipe 157 received into the inner cover 134 may direct light from within the detector 120, such as from a light-emitting diode or other light source, to the outside of the detector 120, or may direct light received from outside of the detector 120 to a sensor or other device within the detector 120 and above inner cover 134. The inner cover 134 is received in abutment against the lip 143 (not shown; see FIG. 2) and the blocking component 128, such that smoke particles moving across the bottom surface 154 are directed toward the smoke chamber 126.

As shown schematically, smoke particles S1, S3 entering the smoke detector 120 move across the bottom surface 154 of the inner cover 134 and into the smoke chamber 126. Smoke particles S2 entering in directions near the blocking component 128 move across the bottom surface 154 and the bottom surface 156 of the blocking component 128 before entering the smoke chamber 126. The projections 152 are angled to direct smoke particles S2 toward the smoke chamber 126 by providing a tapered path across the bottom surface 154 of the outer portion 146 of the inner cover 134 before the particles move over the blocking component 128. The inner cover 134, the optics cover 124, and blocking component 128 are engaged in a sealing manner to prevent gaps within the smoke detector 120 but outside of the smoke chamber 126 that may trap smoke S1, S2, S3 outside of the smoke chamber 126.

Figure 5:
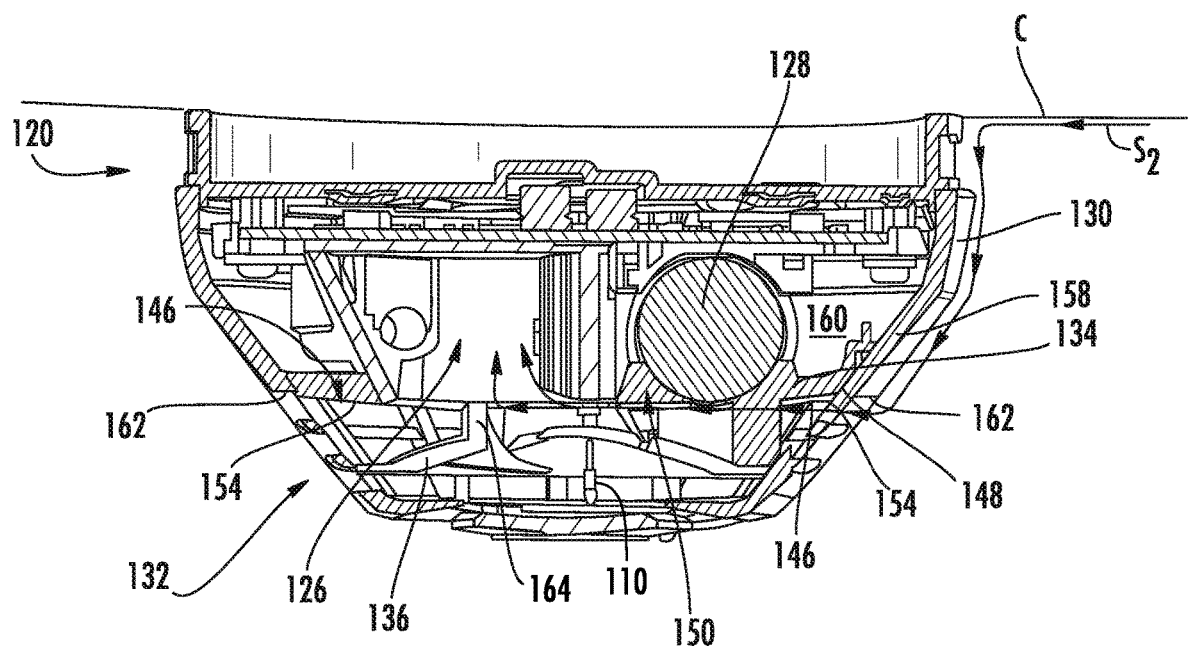
FIG. 5 illustrates a cross sectional view of the example smoke detector of FIG. 2.

FIG. 5 illustrates a cross-sectional view of the example smoke detector 120 shown in FIG. 2. The outer edge 148 of the inner cover 134 is received against the inner surface 158 of the outer cover 130 to prevent smoke from entering gaps other than the smoke chamber 126, such as the gap 160 between the blocking component 128 and the outer cover 130 in some examples. In some examples, as shown, the bottom surface 154 of the outer portion 146 is substantially flush with the upper surface 162 of the entry portion 132.

As shown schematically in FIG. 5 with reference back to FIG. 4, smoke particles S2 may move across a ceiling C, down the outer surface of the outer cover 130, into the smoke detector 120 through the entry portion 132 and across the surface 162, across the bottom surface 154 at the outer portion 146, across the blocking component 128, across the bottom surface 154 at the divider portion 150 and into the smoke chamber 126. Some smoke particles S2 may deflect off a fin 164 of the spoiler 136 toward the smoke chamber 126, as discussed further below.

Figure 6:
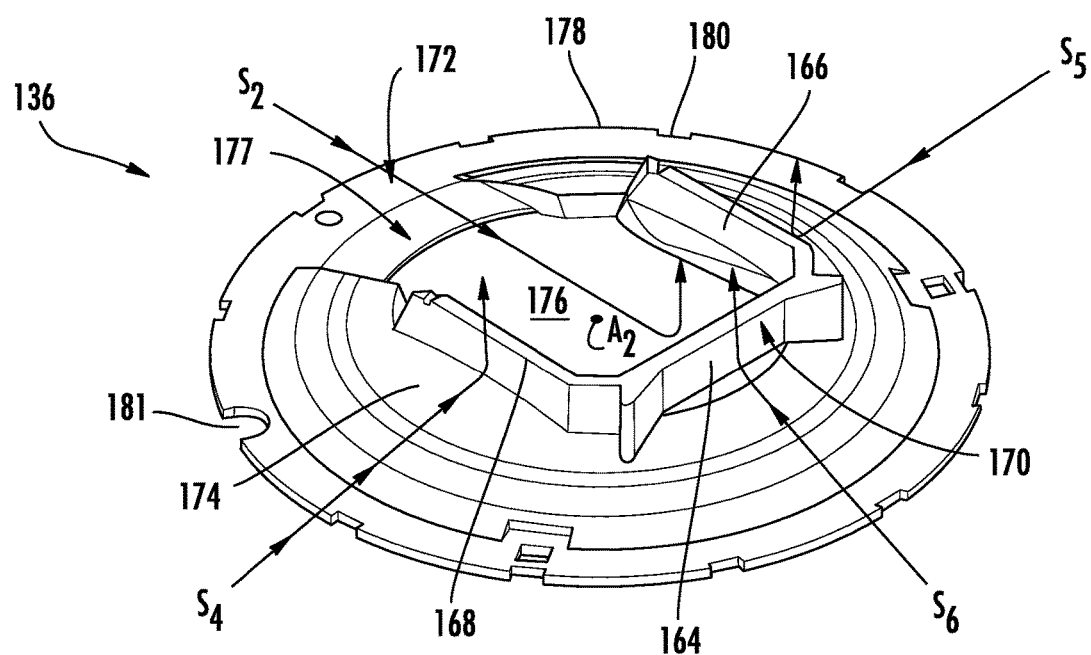
FIG. 6 illustrates the spoiler with a U-shaped fin arrangement of the example smoke detector of FIG. 2.

FIG. 6 illustrates the spoiler 136 with a U-shaped fin arrangement 170 (as shown in FIG. 2) oriented in the upward direction U as it would be within a ceiling mounted configuration of the smoke detector 120. Fins 166 and 168 connect to and extend from the fin 164 to form a U-shaped fin arrangement 170. The U-shaped fin arrangement 170 is positioned to be open toward the blocking component 128 (see FIG. 5). That is, the open side of the U-shaped fin arrangement 170 is nearer the blocking component 128 than the fin 164. One or more of the fins 164, 166, 168 of the U-shaped fin arrangement 170 may include straight portions.

The spoiler 136 includes a ring portion 172 and a conical portion 174 extending upwardly from the ring portion 172. The U-shaped fin arrangement 170 extends from the conical portion 174. The spoiler 136 provides an opening 176 inward (relative to the outer edge 178) of the U-shaped fin arrangement 170. The U-shaped fin arrangement 170 is open toward a void 177 in the conical portion 174 that extends from the opening 176. The ring portion 172 includes an outer edge 178, which may have a number of notches 180 for receiving posts (not shown) of the entry portion 132. The ring portion 172 may be positioned about a central axis A2. In the illustrative example, when assembled the axis A2 of the ring portion 172 aligns with the axis A1 of the outer portion 146 (see FIG. 3). The spoiler 136 may include a light pipe groove 181 for receiving a light pipe indicator 157 (shown in FIG. 4).

As shown schematically in FIG. 6 with reference back to FIGS. 4 and 5, smoke particles S2 may deflect off the fin 164 and into the smoke chamber 126 (not shown). Smoke particles S4 may move along the ring portion 172 and conical portion 174 and deflect off the fin 168 and upward into the smoke chamber 126. Smoke particles S5 may move along the ring portion 172 and conical portion 174 and deflect off the fin 166 and upward into the smoke chamber 126. Smoke particles S6 may move along the ring portion 172 and conical portion 174 and deflect off the fin 164 and upward into the smoke chamber 126.

Figure 14:
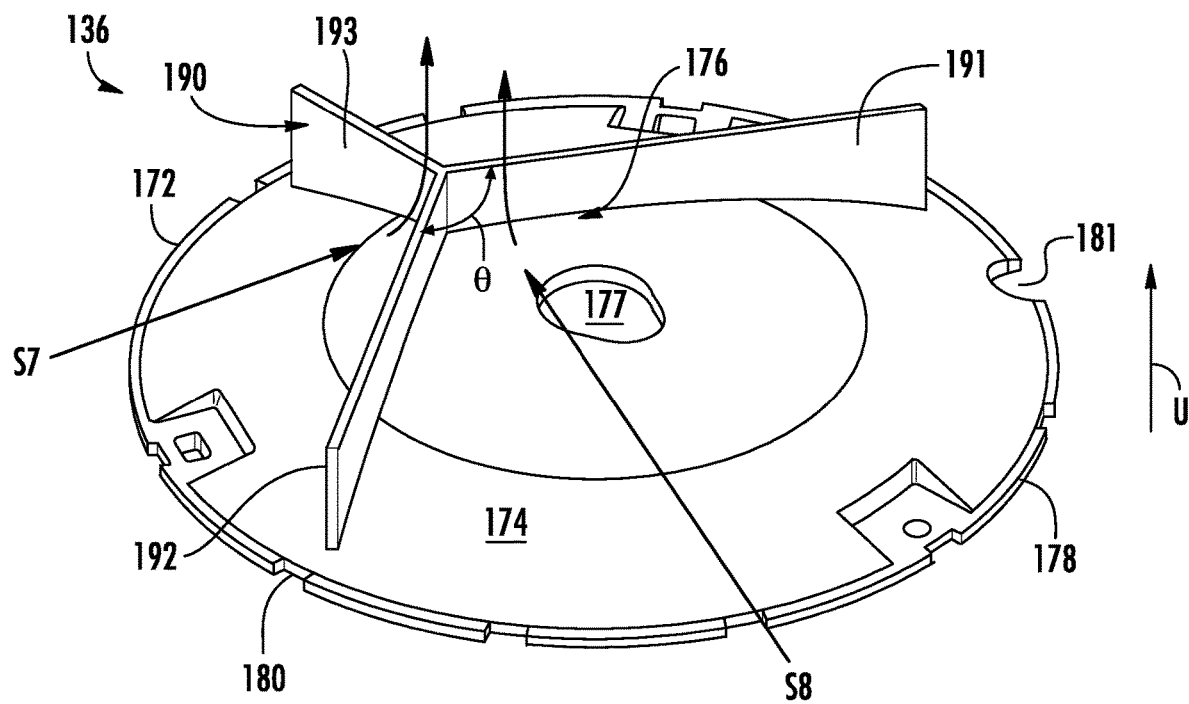
FIG. 14 illustrates a top view of the spoiler with a Y-shaped fin arrangement of the example smoke detector of FIG. 12.
Figure 15:
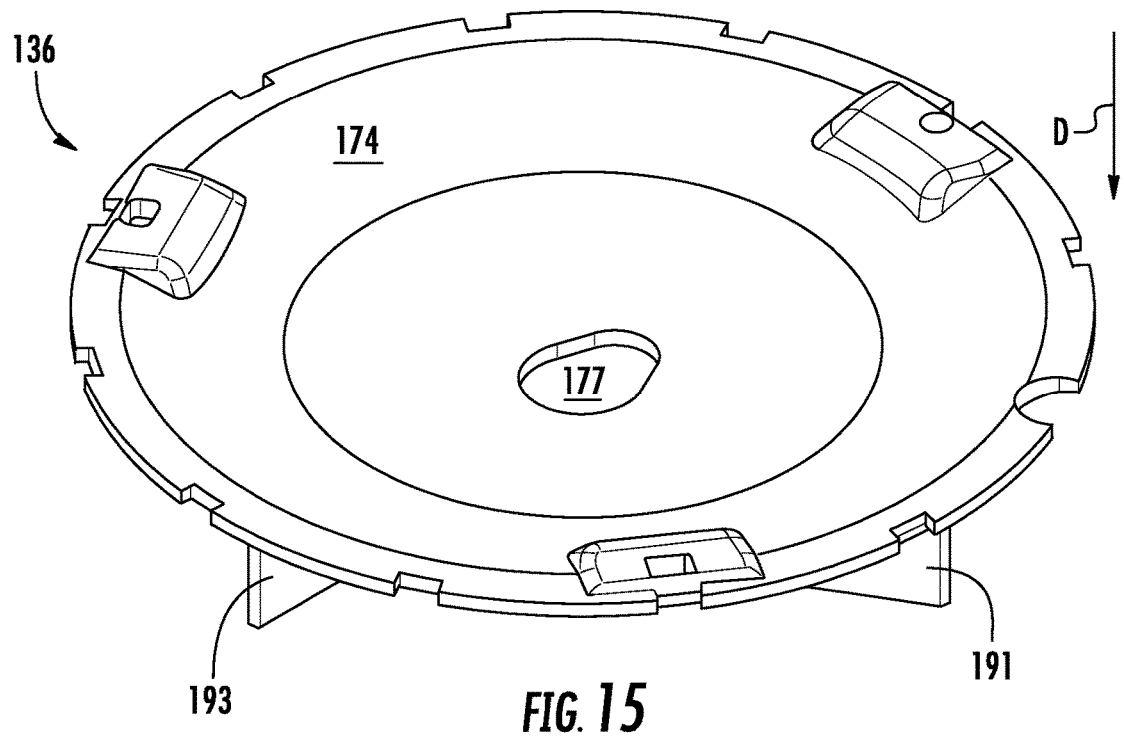
FIG. 15 illustrates a bottom view of the spoiler with a Y-shaped fin arrangement of the example smoke detector of FIG. 12.

FIGS. 14 and 15 illustrate the spoiler 136 with a Y-shaped fin arrangement 190 (as shown in FIG. 3). FIG. 14 illustrates the spoiler 136 in the upward direction U as it would be within a ceiling mounted configuration of the smoke detector 120. FIG. 14 illustrates the spoiler 136 in the downward direction D. Fins 191 and 192 connect to and extend from the fin 193 to form a Y-shaped fin arrangement 190. The first fin 191 and the second fin 192 define an angle θ therebetween. The angle θ, in certain instances, is between 120° and 180°. The third fin 193 may be approximately equidistant from the first fin 191 and the second fin 192. This may be interpreted to mean that the third fin 193 may be no closer to the first fin 191 than the second fin 192 (e.g., the third fin 193 is separated from the first fin 191 and the second fin 192 by approximately equal angles). The Y-shaped fin arrangement 190 is positioned to be open toward the blocking component 128 (not shown; similar to as shown in FIG. 2). That is, the angle θ between the first fin 191 and the second fin 192 is open toward the blocking component 128.

The spoiler 136 includes a ring portion 172 and a conical portion 174 extending upwardly from the ring portion 172. The Y-shaped fin arrangement 190 extends from the conical portion 174. To illustrate the conical portion 174, FIG. 14 depicts the spoiler 136 from a top view (in the upward direction U) and FIG. 15 depicts the spoiler from a bottom view (in the downward direction D). The spoiler 136 provides an opening 176 inward (relative to the outer edge 178) of the Y-shaped fin arrangement 190. The Y-shaped fin arrangement 190 is open toward a void 177 in the conical portion 174 that extends from the opening 176. The void 177 may be configured to receive a thermistor 110 (not shown; see FIGS. 2, 4, and 5). In some embodiments the thermistor 110 received through the void 177 in the spoiler 136 may take one or more temperature readings from between the spoiler 136 and the outer cover 130. As shown, the Y-shaped fin arrangement 190 may be offset from the center of the spoiler 136 and be open to the void 177, which may be positioned approximately in the center of the spoiler 136. This may be interpreted to mean that the intersection of the first fin 191, the second fin 192, and the third fin 193 may be positioned toward the outer edge 178 such that the angle θ between the first fin 191 and the second find 192 is open toward the void 177.

As shown schematically in FIG. 14, smoke particles S7 may deflect off the third fin 193 and into the smoke chamber 126 (not shown). Smoke particles S8 may move along the ring portion 172 and conical portion 174 and deflect off the first fin 191 and/or second fin 192 and upward into the smoke chamber 126. Aspects of spoiler 136 other than the fins may be substantially similar regardless of the arrangement of fins with a U-shaped fin arrangement 170, Y-shaped fin arrangement 190, or other variations thereon. For example, as with the spoiler 136 with the U-shaped fin arrangement 170 (shown in FIG. 6), the spoiler 136 with the Y-shaped fin arrangement 190 may include a number of notches 180 on the outer edge 178 of the ring portion 172 for receiving posts (not shown) of the entry portion 132 (shown in FIGS. 7 and 16). Additionally, the spoiler 136 may include a light pipe groove 181 for receiving a light pipe indicator 157 (shown in FIG. 4).

Figure 7:
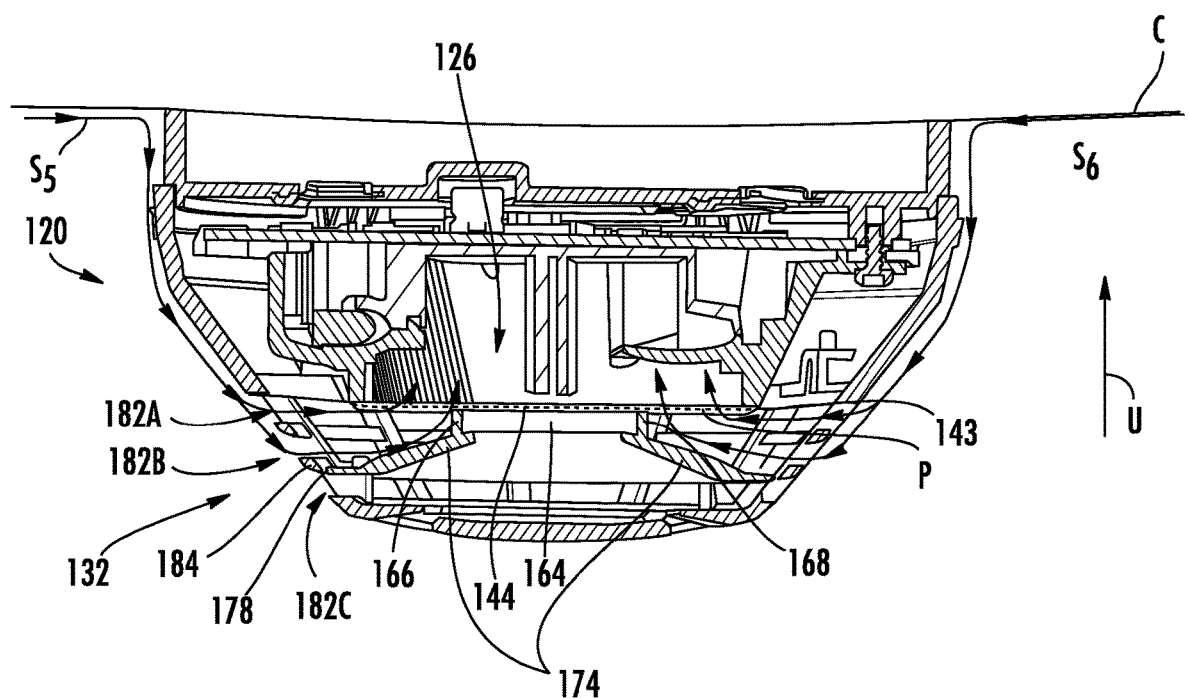
FIG. 7 illustrates a cross sectional view of the example smoke detector of FIG. 2.

FIGS. 7 and 16 show a cross sectional view of the example smoke detector 120 (FIG. 7 depicting the smoke detector 120 including the spoiler 136 with the U-shaped fin arrangement 170 and FIG. 16 depicting the smoke detector 120 including the spoiler 136 with the Y-shaped fin arrangement 190), showing smoke particle paths S5, S6 and S7, S8, with reference to FIGS. 6 and 14, respectively. As shown, the example conical portion 174 tapers as it extends upward toward the smoke chamber 126 to form a continuous surface from the entry portion 132 to the leading edge of the chamber 126. The outer edge 178 of the spoiler 136 is received against the inner surface 158 of the outer cover 130 at the entry portion 132. In some examples, as shown, the entry portion 132 provides three rows of openings 182A, 182B, and 182C, and the edge 178 is received against the horizontal bar 184 between the lower two rows 182B and 182C. In some examples, as shown, the fins (164, 166, 168 for the spoiler 136 with the U-shaped fin arrangement 170, and 191, 192, 193 for the spoiler 136 with the Y-shaped fin arrangement 190) extend to a plane P at the lip 143 of the smoke chamber 126. In some examples, as shown the bug screen 144 may be positioned along the plane P. Other heights can be utilized in some examples. The fins (164, 166, 168 for the spoiler 136 with the U-shaped fin arrangement 170, and 191, 192, 193 for the spoiler 136 with the Y-shaped fin arrangement 190) extend from the conical portion 174 upward toward the smoke chamber 126.

Figure 8:
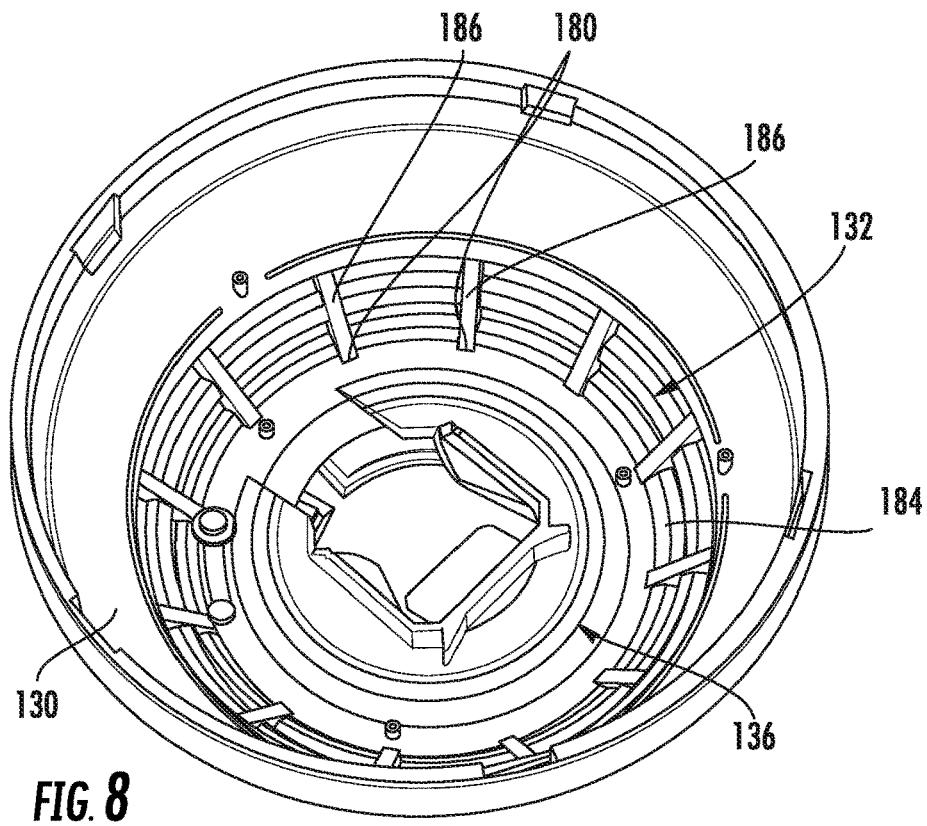
FIG. 8 illustrates the example spoiler of FIG. 6 received within an example outer cover.

FIG. 8 illustrates the exemplary spoiler 136 shown in FIG. 6 received against the horizontal bar 184 of the entry portion 132 of the outer cover 130. The notches 180 receive the posts 186 of the entry portion 132.

Figure 9:
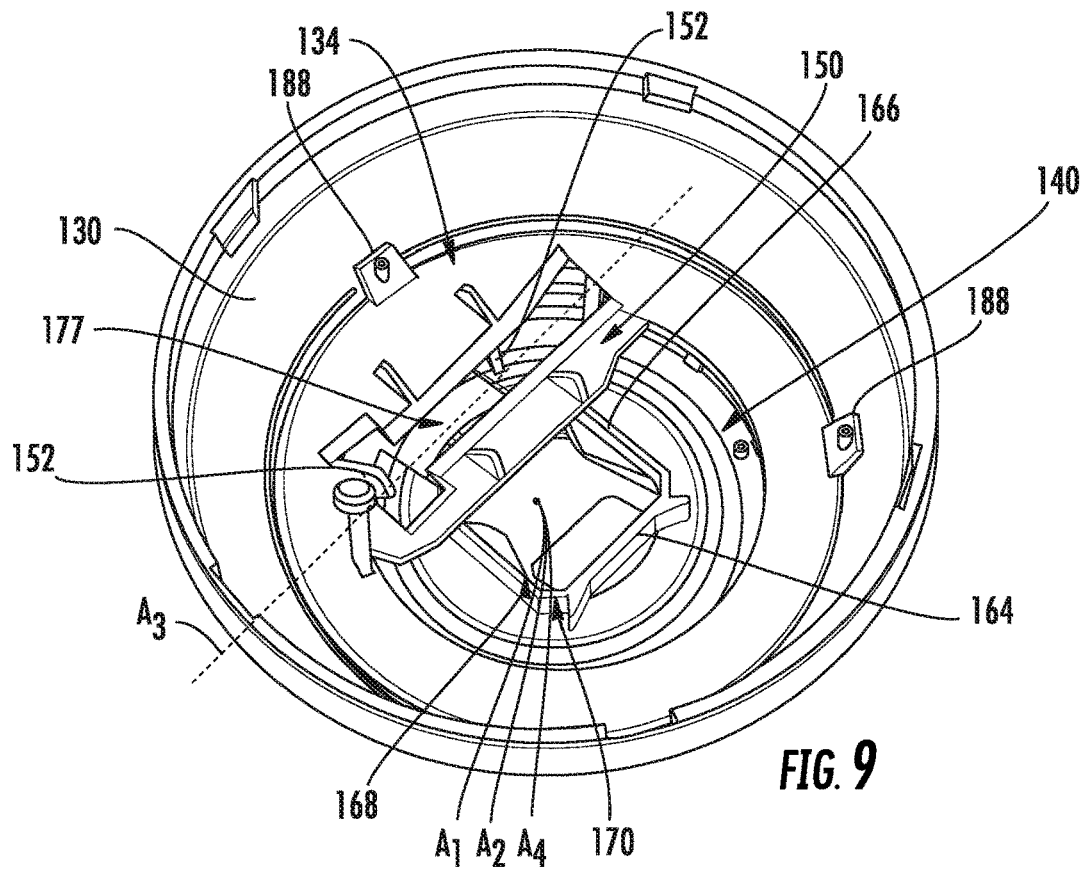
FIG. 9 illustrates the example inner cover of FIG. 3 received within the example outer cover of FIG. 8.

FIG. 9 illustrates the inner cover 134 attached to the outer cover 130. In some examples, the inner cover 134 is heat staked to the outer cover 130. In some examples, the inner cover 134 is snap fit to the outer cover 130. In some examples, the inner cover 134 includes tabs 188 for attachment to the outer cover 130.

When assembled, the fin 164 of the spoiler 136 with the U-shaped fin arrangement 170 is substantially parallel to the central axis A3 of the blocking component 128 (not shown). In some examples, as shown, the fins 166 and 168 of the spoiler 136 with the U-shaped fin arrangement 170 are substantially parallel to one another. This may be interpreted to mean that each respective fin 166, 168 forms a substantially right angle with fin 164 (90°, +/−5°). Like the third fin 193 of the Y-shaped configuration 190 with respect to the first fin 191 and the second fin 192, fin 164 of the U-shaped configuration 170, in certain instances, may be approximately equidistant from each respective fin 166, 168 (e.g., fin 164 may be separated from fin 166 and fin 168 by approximately equal angles). Regardless of whether configured in with the U-shaped fin arrangement 170 or a Y-shaped fin arrangement 190, the projections 152 may provide a tapered path toward the opening of the fin arrangement 170, 190. The void 177 is positioned within the same circumferential region as the blocking component 128 (not shown). The ends of the fins (166, 168 for the spoiler 136 with the U-shaped fin arrangement 170 and 191, 192 for the spoiler 136 with the Y-shaped fin arrangement 190) may be received against the divider portion 150. The outer cover 130 may be positioned relative to a central axis A4, such that the axes A1, A2, and A4 are substantially aligned.

The example smoke detector 120 utilizes Brownian motion principles for the motion of smoke particles within air. Brownian principles describe the ability of small smoke particles to remain suspended due to interactions with the atmosphere with motions that are energetic enough to resist the pull of gravity which would force these particles to fall to earth. The inner cover 134 seals gaps and prevents smoke particles from settling within the gaps instead of moving into the smoke chamber 126. The placement and angling of the various surfaces, fins, and projections of the inner cover 134 and spoiler 136 in the illustrative example direct smoke particles into the smoke chamber 126 in an improved, uniform manner relative to the prior art. Detection among various angles of entry relative to the horizontal plane of the smoke detector 120 is more uniform as compared to prior art smoke detectors.

Figure 10:
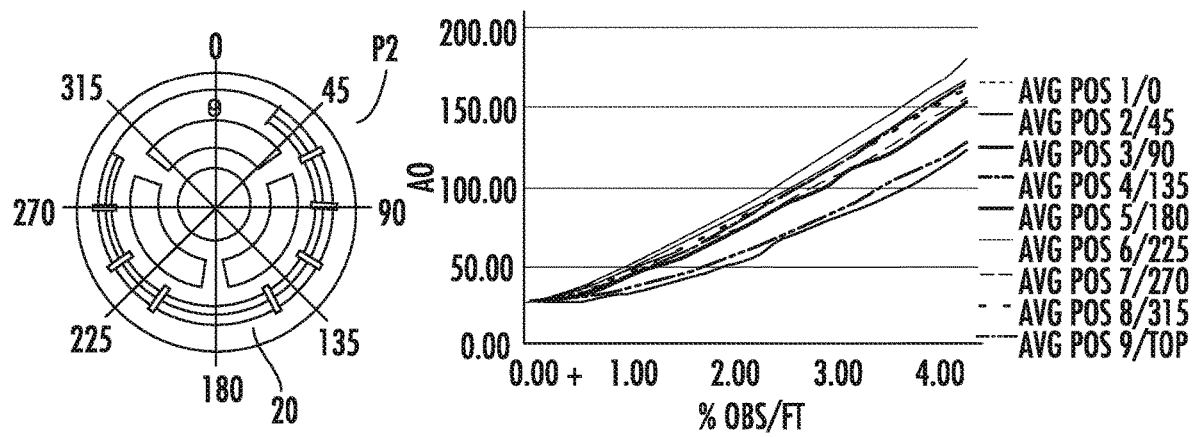
FIG. 10 illustrates a performance graph of the prior art smoke detector of FIG. 1.

FIG. 10 illustrates a graph, for the various positions shown in the horizontal plane P2 of the prior art smoke detector 20 (shown in FIG. 1), of smoke in air denoted by obscuration per foot (OBS/ft) against the analog signal converted to a digital output (AD) of refracted light detected by the photodiode from the forward scatter infrared LED. The Forward (F) infrared (IR) LED emits radiation in the smoke chamber 26 and some of this radiation is scattered in the forward direction towards the photodiode which is a direct function of obscuration % of smoke. Each of the curves represent the behavior of a single smoke detector for its specified angle of entry of the smoke path into the prior art smoke detector 20. A wide variation of signal response is observed. That is, as seen, there was significant variance of detection among the various angles of entry into the prior art smoke detector 20.

Figure 11:
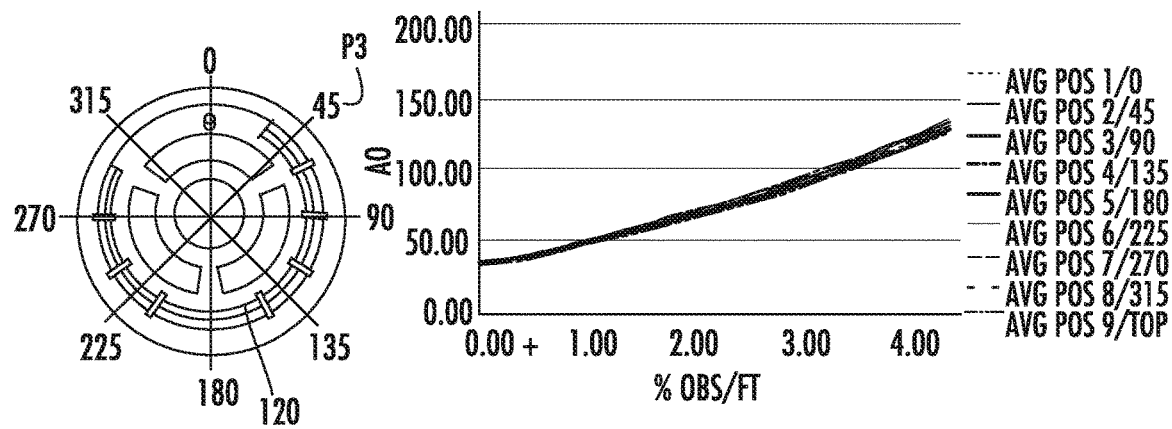
FIG. 11 illustrates a performance graph of the example smoke detector.

FIG. 11 illustrates a similar graph for the corresponding various positions in the horizontal plane P3 of the example smoke detector 120 with the spoiler 136. As seen, there was more uniform detection between the various angles of entry into the example smoke detector 120. The inner cover 134 and the spoiler 136 of the illustrative example facilitate a uniform signal regardless of orientation of smoke entry into the example smoke detector 120. Thus, the detector 120 is more equally sensitive in all orientations. One of ordinary skill in the art having the benefit of this disclosure would recognize that certain modifications could be made to the illustrative example, while still achieving similar benefits.

Although the different examples are illustrated as having specific components, the examples of this disclosure are not limited to those particular combinations. It is possible to use some of the components or features from any of the examples in combination with features or components from any of the other examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A photoelectric smoke detector, comprising:
   an optics cover providing a smoke chamber having a smoke chamber opening;
   a blocking component mounted to the optics cover;
   an inner cover providing a first opening and a second opening, wherein the first opening receives a portion of the blocking component and the second opening is aligned with the smoke chamber opening;
   a spoiler received against the inner cover, the spoiler including at least one of: a U-shaped fin arrangement and a Y-shaped fin arrangement.

2. The smoke detector as recited in claim 1, wherein the second opening has a contour substantially the same as a contour of a lip of the optics cover, providing the smoke chamber opening.

3. The smoke detector as recited in claim 1, wherein the first opening is substantially T-shaped.

4. The smoke detector as recited in claim 3, wherein the second opening is substantially D-shaped.

5. The smoke detector as recited in claim 1, wherein the inner cover includes a divider portion that separates the first opening from the second opening.

6. The smoke detector as recited in claim 1, wherein the fin arrangement abuts the divider portion.

7. The smoke detector as recited in claim 1, wherein the inner cover includes first and second projections angled to create a tapered path across an outer portion of the inner cover.

8. The smoke detector as recited in claim 1, wherein the spoiler includes
   a ring portion, and
   a conical portion extending from the ring portion, and the fin arrangement extends from the conical portion.

9. The smoke detector as recited in claim 8, wherein the conical portion tapers as it extends toward the optics cover.

10. The smoke detector as recited in claim 1, comprising an outer cover attached to a base portion, wherein the outer cover includes an open entry portion.

11. The smoke detector as recited in claim 10, wherein a gap is provided between the blocking component and the outer cover, and the inner cover seals the gap from the entry portion to prevent smoke particles from entering the gap.

12. The smoke detector as recited in claim 10, wherein the entry portion includes a first row of openings, a second row of openings, and a third row of openings, and a bottom surface of the inner cover is flush with an upper surface of the first row of openings.

13. The smoke detector as recited in claim 12, wherein an outer edge of the spoiler is received against a horizontal bar between the second row of openings and the third row of openings.

14. The smoke detector as recited in claim 1, wherein the inner cover is heat staked to an outer cover.

15. The smoke detector as recited in claim 1, wherein the inner cover is snap-fit to an outer cover.

16. The smoke detector as recited in claim 1, comprising:
   a bug screen positioned over the smoke chamber opening.

17. The smoke detector as recited in claim 1, wherein the fin arrangement extends to a plane provided at an outer lip of the smoke chamber, and the outer lip provides the smoke chamber opening.

18. The smoke detector as recited in claim 1, wherein the fin arrangement is open toward the blocking component.

19. The smoke detector as recited in claim 1, wherein the U-shaped fin arrangement includes:
   a first fin portion substantially parallel to a central axis of the blocking component,
   a second fin portion, and
   a third fin portion substantially parallel to the second fin portion.

20. The smoke detector as received in claim 1, wherein the Y-shaped fin arrangement includes:
   a first fin portion and a second fin portion defining an angle therebetween, and a third fin portion approximately equidistant from the first fin portion and the second fin portion.

21. A photoelectric smoke detector, comprising:
   a base portion;
   a circuit received on the base portion;
   an optics cover mounted to the base portion and providing a smoke chamber having a smoke chamber opening;
   a blocking component mounted to the optics cover;
   an inner cover providing a first opening and a second opening, wherein the first opening receives a portion of the blocking component and the second opening is aligned with the smoke chamber opening;
   a spoiler including a ring portion, a conical portion extending from the ring portion toward the smoke chamber, and at least one of: a U-shaped fin arrangement and a Y-shaped fin arrangement extending from the conical portion, the spoiler being received against the inner cover; and
   an outer cover attached to a base portion, wherein the outer cover includes an open entry portion, wherein a gap is provided between the blocking component and the outer cover, and the inner cover seals the gap from the entry portion to prevent smoke particles from entering the gap.

* * * * *